US012634912B2

(12) United States Patent
Zhu et al.

(10) Patent No.: US 12,634,912 B2
(45) Date of Patent: May 19, 2026

(54) REFINED BEAM PREDICTION WITH WIDE BEAM MEASUREMENTS

(71) Applicant: NOKIA TECHNOLOGIES OY, Espoo (FI)

(72) Inventors: Qiping Zhu, Wheaton, IL (US); Frederick Vook, Schaumburg, IL (US)

(73) Assignee: Nokia Technologies Oy, Espoo (FI)

( * ) Notice: Subject to any disclaimer, the term of this patent is extended or adjusted under 35 U.S.C. 154(b) by 485 days.

(21) Appl. No.: 17/819,172

(22) Filed: Aug. 11, 2022

(65) Prior Publication Data

US 2024/0064724 A1    Feb. 22, 2024

(51) Int. Cl.
*H04W 72/044* (2023.01)
*H04W 16/28* (2009.01)

(52) U.S. Cl.
CPC ......... *H04W 72/046* (2013.01); *H04W 16/28* (2013.01)

(58) Field of Classification Search
CPC ............................ H04W 72/046; H04W 16/28
See application file for complete search history.

(56) References Cited

U.S. PATENT DOCUMENTS

| | | | | |
|---|---|---|---|---|
| 2012/0212458 A1* | 8/2012 | Drumm | .................... | G06F 3/042 |
| | | | | 345/175 |
| 2020/0351892 A1 | 11/2020 | Yi et al. | | |

| | | | | |
|---|---|---|---|---|
| 2021/0160022 A1* | 5/2021 | Cha | ....................... | H04L 5/0048 |
| 2021/0167834 A1* | 6/2021 | Raghavan | ............ | H04B 7/0695 |
| 2022/0038146 A1 | 2/2022 | Mo et al. | | |
| 2022/0264475 A1* | 8/2022 | Yi | ........................ | H04W 72/046 |
| 2023/0026501 A1* | 1/2023 | Li | ......................... | H04B 7/0695 |
| 2023/0284065 A1* | 9/2023 | Zhou | ..................... | H04W 24/10 |
| | | | | 370/252 |
| 2023/0397029 A1* | 12/2023 | Bai | ........................ | H04B 7/063 |

FOREIGN PATENT DOCUMENTS

| | | |
|---|---|---|
| WO | 2017105299 A1 | 6/2017 |

OTHER PUBLICATIONS

Extended European Search Report for European Application No. 23188085.7, mailed on Jun. 28, 2024, 24 pages.
GPP TSG RAN WG1 #109-e; R1-2203454; "Discussion on Other Aspects on AI/ML for Beam Management"; Source: CATT; Agenda Item: 9.2.3.2; e-Meeting; May 9-20, 2022; 7 pages.

(Continued)

*Primary Examiner* — Kevin M Cunningham
(74) *Attorney, Agent, or Firm* — Brake Hughes Bellermann LLP

(57) ABSTRACT

Various techniques are provided for determining, by a base station, a beam coverage in a cell, the beam coverage including angle range for an azimuth and an angle range for an elevation, determining, by the base station, an angle quantization step, generating, by the base station, a grid of narrow beams based on the angle range and the angle quantization step, computing, by the base station, a beam index matrix based on the grid of narrow beams, generating, by the base station, a wide beam codebook based on the grid of narrow beams, and transmitting, by the base station, at least one of a CSI-RS resource and a SSB resource using multiple-TX-directions wide beams based on the wide beam codebook.

8 Claims, 10 Drawing Sheets

(56) References Cited

OTHER PUBLICATIONS

3GPP TSG-RAN WG1 #87; R1-1611929; "Codebook with Beam Broadening"; Source: Intel Corporation; Agenda Item: 6.2.2.1.3; Reno, Nevada, USA; Nov. 14-18, 2016; 5 pages.

Partial European Search Report for European Patent Application No. 23188085.7, mailed on Feb. 7, 2024, 18 pages.

3GPP TSG RAN WG1 Meeting #86bis, R1-1609465; "Discussion on Beam Broadening Codebook for More Than 16 Antenna Ports"; Source: Intel Corporation; Agenda Item: 7.2.2.1.4; Lisbon, Portugal; Oct. 10-14, 2016; 6 pages.

3GPP TSG-RAN WG1 #87, R1-1611983; "Discussion on NR Codebook Design"; Source: Intel Corporation; Agenda Item: 7.1. 3.3; Reno, USA; Nov. 14-18, 2016; 9 pages.

3GPP TSG RAN WG1 #109, R1-2204574; "Other Aspects on ML for Beam Management", Agenda item: 9.2.3.2; Source: Nokia, Nokia Shanghai Bell; e-Meeting; May 9-20, 2022; 12 pages.

3GPP TS 38.321; V17.0.0; "3rd Generation Partnership Project; Technical Specification Group Radio Access Network; NR; Medium Access Control (MAC) Protocol Specification (Release 17)"; Sophia Antipolis, Valbonne, France; Mar. 2022; 221 pages.

3GPP TS RAN Meeting #94e, RP-213599; "Study on Artificial Intelligence (AI)/Machine Learning (ML) for NR Air Interface", Source: Qualcomm (Moderator); Agenda Item: 8.6.1; Electronic Meeting; Dec. 6-17, 2021; 6 pages.

3GPP TS 38.213; V17.2.0; "3rd Generation Partnership Project; Technical Specification Group Radio Access Network; NR; Physical Layer Procedures for Control (Release 17)"; Sophia Antipolis, Valbonne, France; Jun. 2022; 256 pages.

3GPP TS 38.214; V17.2.0; "3rd Generation Partnership Project; Technical Specification Group Radio Access Network; NR; Physical Layer Procedures for Data (Release 17)"; Sophia Antipolis, Valbonne, France; Jun. 2022; 228 pages.

3GPP TR 38.802, V14.2.0; "3rd Generation Partnership Project; Technical Specification Group Radio Access Network; Study on New Radio Access Technology Physical Layer Aspects (Release 14)"; Sophia Antipolis, Valbonne, France; Sep. 2017; 144 pages.

Echigo et al. "A Deep Learning-Based Low Overhead Beam Selection in mmWave Communications"; IEEE Transactions on Vehicular Technology; vol. 70, No. 1; Jan. 2021; pp. 682-691.

Ma et al. "Deep Learning Assisted Calibrated Beam Training for Millimeter-Wave Communication Systems"; IEEE Transactions on Communications; vol. 69, No. 10; Oct. 2021; pp. 6706-6721.

Noh et al. "Multi-Resolution Codebook and Adaptive Beamforming Sequence Design for Millimeter Wave Beam Alignment"; IEEE Transactions on Wireless Communications; vol. 16, No. 9; Sep. 2017; pp. 5689-5701.

Communication pursuant to Article 94(3) EPC for European Patent Application No. 23188085.7, mailed on Jul. 28, 2025, 5 pages.

* cited by examiner

Example Wireless Network 130

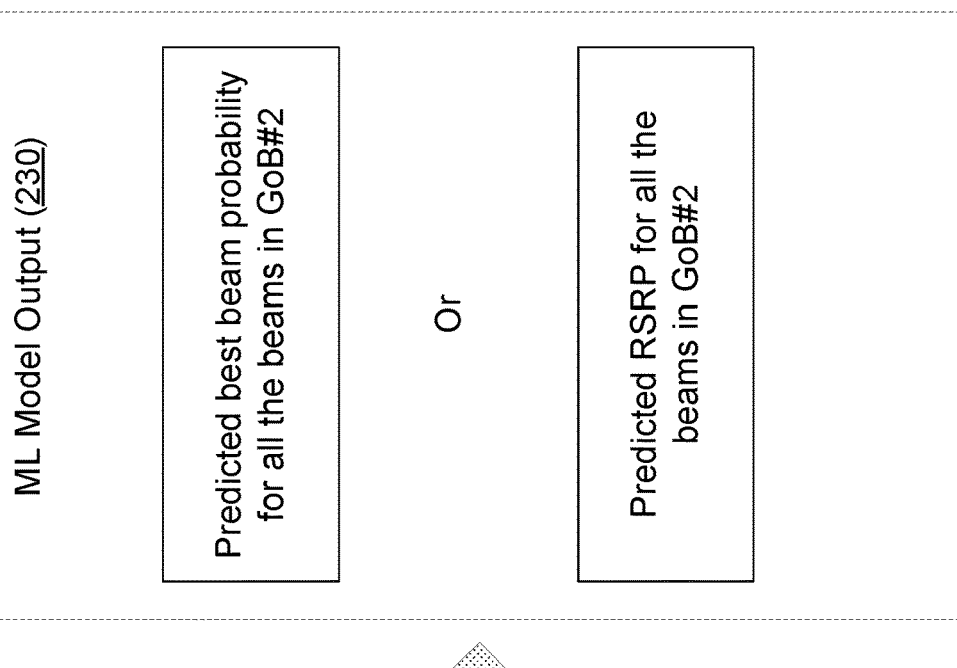
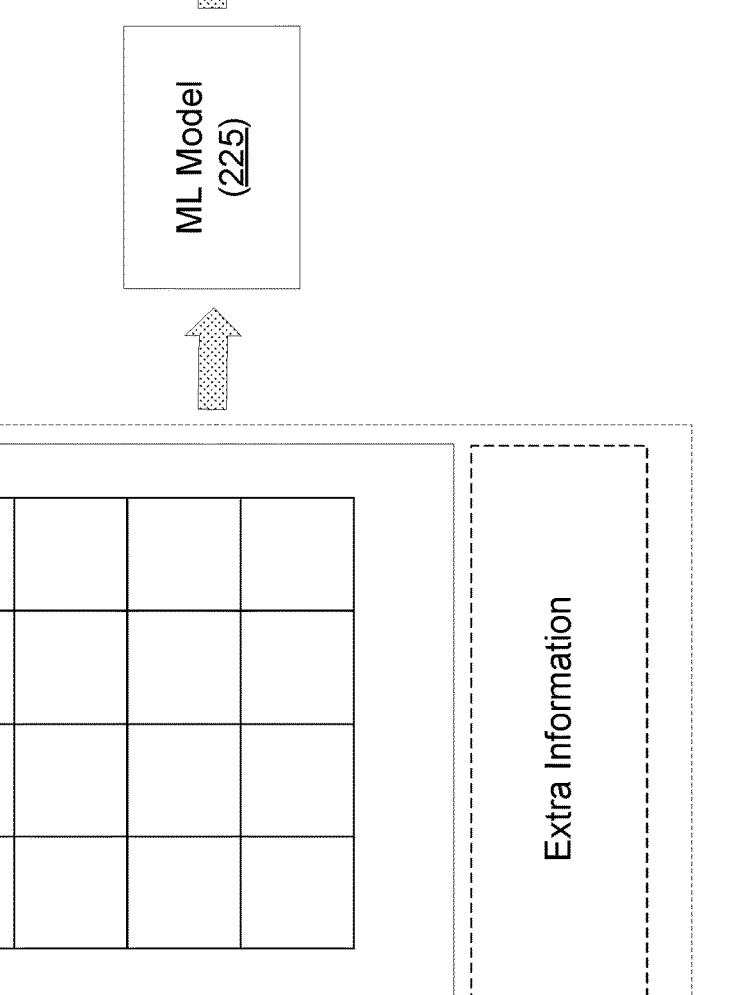
FIG. 2B

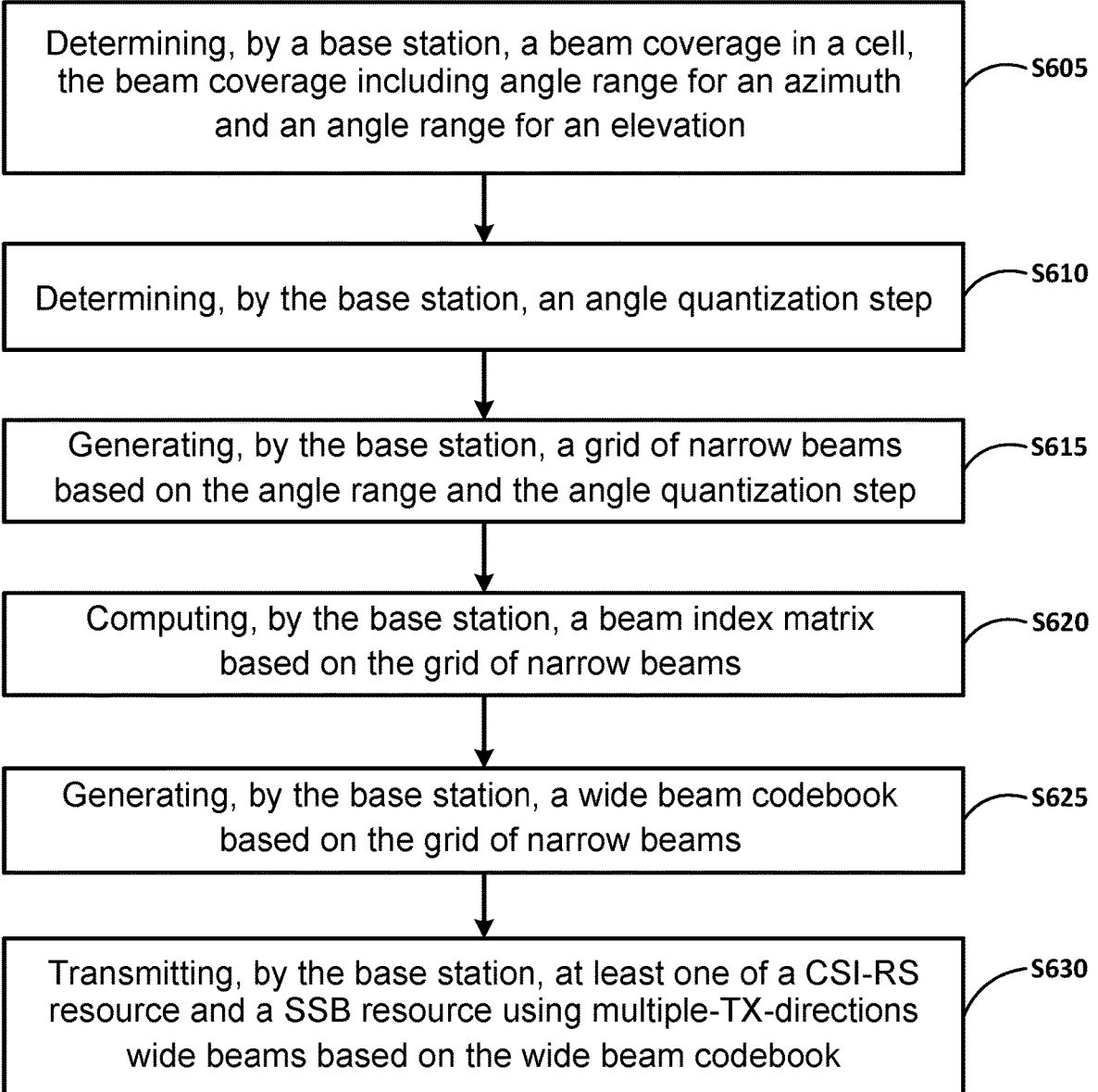

Determining, by a base station, a beam coverage in a cell, the beam coverage including angle range for an azimuth and an angle range for an elevation — S605

Determining, by the base station, an angle quantization step — S610

Generating, by the base station, a grid of narrow beams based on the angle range and the angle quantization step — S615

Computing, by the base station, a beam index matrix based on the grid of narrow beams — S620

Generating, by the base station, a wide beam codebook based on the grid of narrow beams — S625

Transmitting, by the base station, at least one of a CSI-RS resource and a SSB resource using multiple-TX-directions wide beams based on the wide beam codebook — S630

FIG. 6

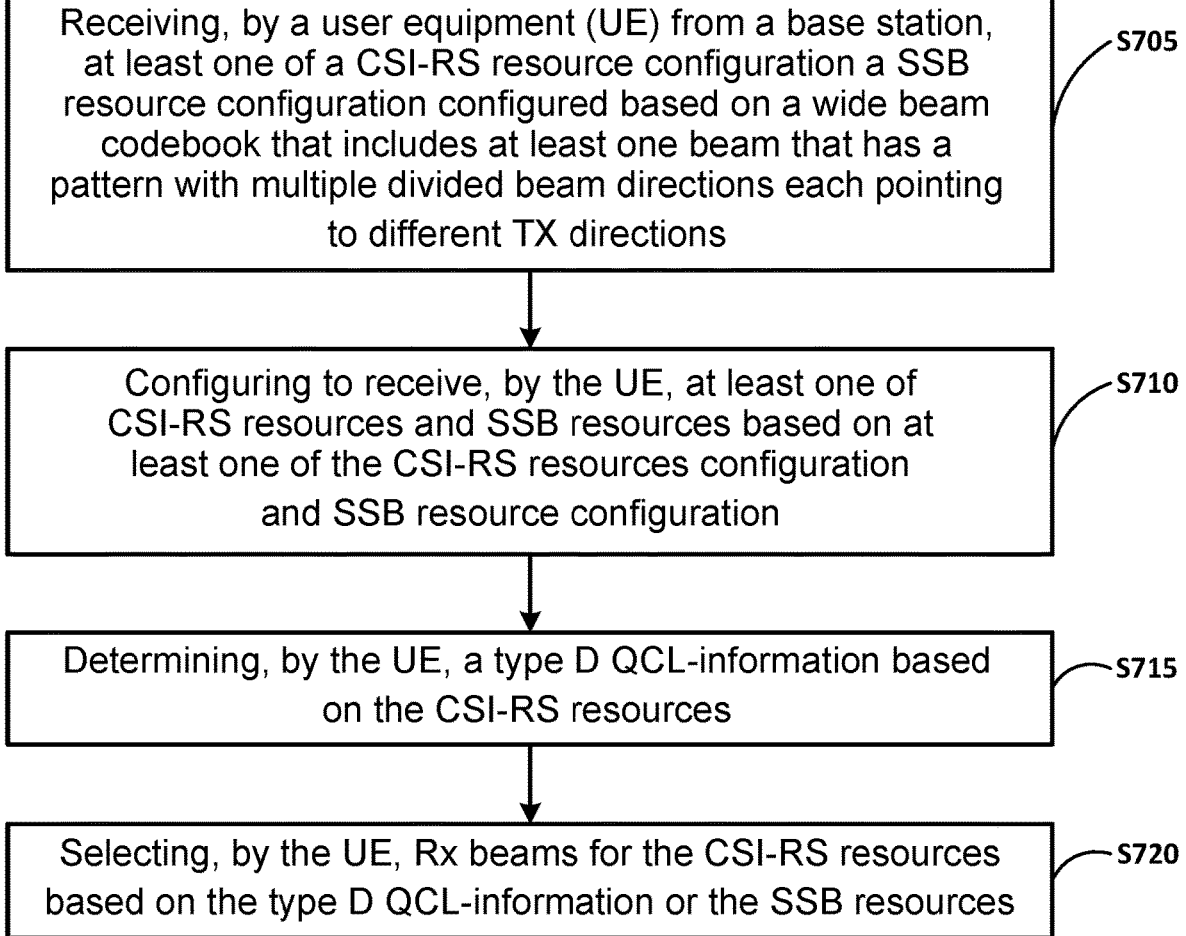

Receiving, by a user equipment (UE) from a base station, at least one of a CSI-RS resource configuration a SSB resource configuration configured based on a wide beam codebook that includes at least one beam that has a pattern with multiple divided beam directions each pointing to different TX directions ⟋S705

Configuring to receive, by the UE, at least one of CSI-RS resources and SSB resources based on at least one of the CSI-RS resources configuration and SSB resource configuration ⟋S710

Determining, by the UE, a type D QCL-information based on the CSI-RS resources ⟋S715

Selecting, by the UE, Rx beams for the CSI-RS resources based on the type D QCL-information or the SSB resources ⟋S720

FIG. 7

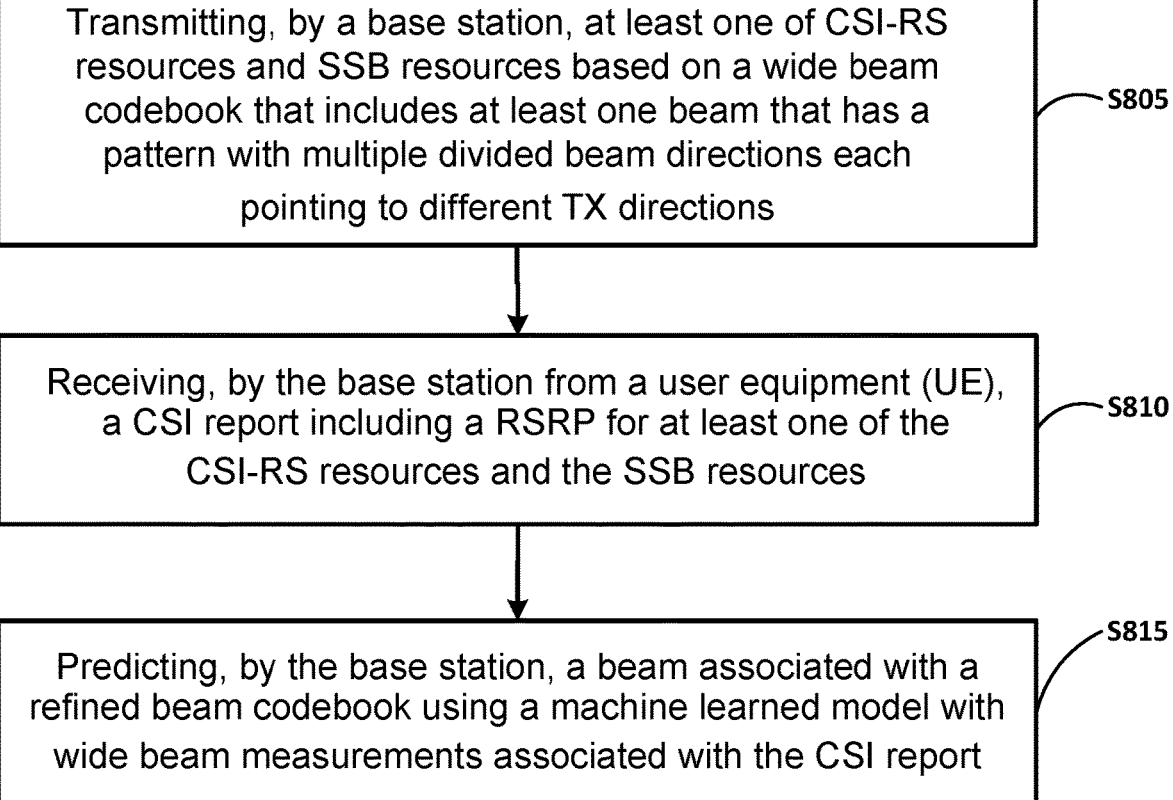

Transmitting, by a base station, at least one of CSI-RS resources and SSB resources based on a wide beam codebook that includes at least one beam that has a pattern with multiple divided beam directions each pointing to different TX directions ⟋S805

Receiving, by the base station from a user equipment (UE), a CSI report including a RSRP for at least one of the CSI-RS resources and the SSB resources ⟋S810

Predicting, by the base station, a beam associated with a refined beam codebook using a machine learned model with wide beam measurements associated with the CSI report ⟋S815

FIG. 8

REFINED BEAM PREDICTION WITH WIDE BEAM MEASUREMENTS

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process to meet the requirements of 5G, similar to earlier evolution of 3G and 4G wireless networks. 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a device, a system, a non-transitory computer-readable medium (having stored thereon computer executable program code which can be executed on a computer system), and/or a method can perform a process including determining, by a base station, a beam coverage in a cell, the beam coverage including angle range for an azimuth and an angle range for an elevation, determining, by the base station, an angle quantization step, generating, by the base station, a grid of narrow beams based on the angle range and the angle quantization step, computing, by the base station, a beam index matrix based on the grid of narrow beams, generating, by the base station, a wide beam codebook based on the grid of narrow beams, and transmitting, by the base station, at least one of a CSI-RS resource and a SSB resource using multiple-TX-directions wide beams based on the wide beam codebook.

Implementations can include one or more of the following features and/or any combinations thereof. For example, the beam index matrix can specify which narrow beams of the grid of narrow beams can be covered by each wide beam of the wide beam codebook. The method can further include combining two or more narrow beams in the wide beam codebook and calculating combining coefficients for the two or more narrow beams. The method can further include training a machine learned model using the wide beam codebook and a training dataset including wide beam measurements, wherein a stopping criteria is based on a beam prediction accuracy. The method can further include predicting a beam from a refined beam codebook using the machine learned model with wide beam measurements as input. The method can further include communicating, by the base station to a user equipment (UE), the machine learned model and receiving, by the base station to the UE, a beam predicted using the machine learned model.

The wide beam codebook can include at least one beam that has a pattern with multiple divided beam directions each pointing to different TX directions and the different TX directions can correspond to different preferred RX beams. The method can further include at least one of configuring CSI-RS resources and configuring SSB resources based on the wide beam codebook and communicating the configured CSI-RS resources to a UE. The configured CSI-RS resources can include a CSI-RS resource with multiple TCI states and each configured TCI state can include a type D QCL-information. The configured CSI-RS resources can include a plurality of CSI-RS resources that are configured with a same resource mapping and a same sequence scrambling identity.

According to another example embodiment, a device, a system, a non-transitory computer-readable medium (having stored thereon computer executable program code which can be executed on a computer system), and/or a method can perform a process including receiving, by a user equipment (UE) from a base station, at least one of a CSI-RS resource configuration a SSB resource configuration configured based on a wide beam codebook that includes at least one beam that has a pattern with multiple divided beam directions each pointing to different TX directions, configuring to receive, by the UE, at least one of CSI-RS resources and SSB resources based on at least one of the CSI-RS resources configuration and SSB resource configuration, determining, by the UE, a type D QCL-information based on the CSI-RS resources, and selecting, by the UE, Rx beams for the CSI-RS resources based on the type D QCL-information or the SSB resources.

Implementations can include one or more of the following features and/or any combinations thereof. For example, the method can further include measuring, by the UE, RSRP for at least one of the CSI-RS resources and the SSB resources, generating, by the UE, a CSI report based on the measured RSRP, and communicating, by the UE to the base station, the CSI report. The method can further include determining whether the CSI-RS resources include a repetition indication and in response to determining that at least one of the CSI-RS resources and the SSB resources do not include the repetition indication, selecting, by the UE, a best RX beam that can maximize a RSRP measurement. The method can further include receiving, by the UE from the base station, a machine learned model trained using the wide beam codebook and a training dataset including wide beam measurements and predicting a best beam from a refined beam codebook using the machine learned model with RSRP measurements associated with a CSI report. The CSI report can include the predicted beam from the refined beam codebook.

According to another example embodiment, a device, a system, a non-transitory computer-readable medium (having stored thereon computer executable program code which can be executed on a computer system), and/or a method can perform a process including transmitting, by a base station, at least one of CSI-RS resources and SSB resources based on a wide beam codebook that includes at least one beam that has a pattern with multiple divided beam directions each pointing to different TX directions, receiving, by the base station from a user equipment (UE), a CSI report including a RSRP for at least one of the CSI-RS resources and the SSB resources, and predicting, by the base station, a beam associated with a refined beam codebook using a machine learned model with wide beam measurements associated with the CSI report.

Implementations can include one or more of the following features and/or any combinations thereof. For example, the method can further include combining two or more narrow beams in the wide beam codebook and calculating combining coefficients for the two or more narrow beams. The method can further include configuring at least one of the CSI-RS resources and the SSB resources based on the wide beam codebook and communicating at least one of the configured CSI-RS resources and the SSB resources to a UE. The configured CSI-RS resources can include a CSI-RS resource with multiple TCI states and each configured TCI state can include a type D QCL-information. The machine learned model can be trained using the wide beam codebook and a training dataset including wide beam measurements.

The details of one or more examples of embodiments are set forth in the accompanying drawings and the description below. Other features will be apparent from the description and drawings, and from the claims.

BRIEF DESCRIPTION OF THE DRAWINGS

FIG. 2B is a block diagram illustrating a machine learning based beam prediction in the spatial domain according to an example embodiment.

FIG. 6 is a block diagram of a method of operating a base station according to an example embodiment.

FIG. 7 is a block diagram of a method of operating a user equipment according to an example embodiment.

FIG. 8 is a block diagram of a method of operating a base station according to an example embodiment.

DETAILED DESCRIPTION

Figure 1:
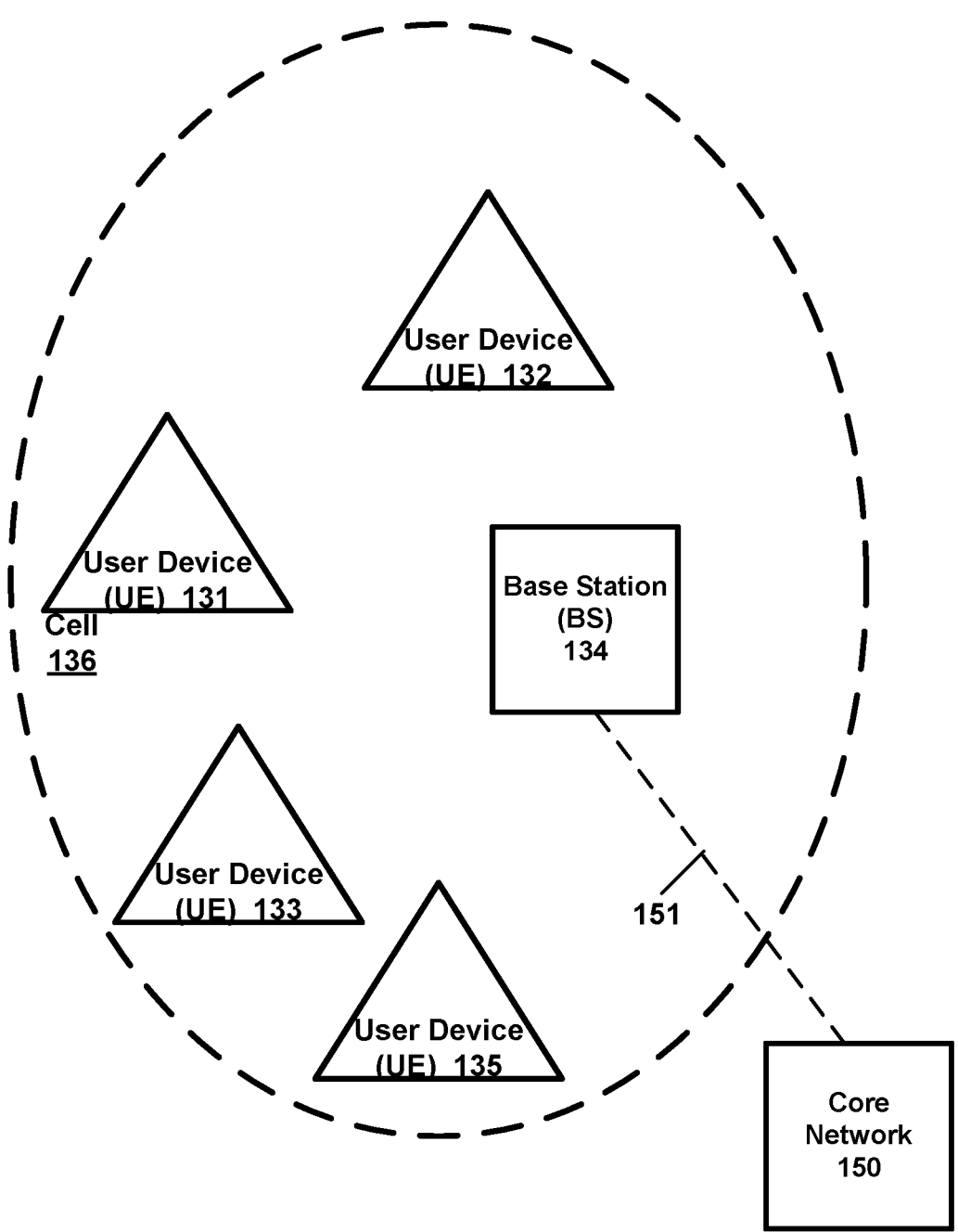
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a BS, next generation Node B (gNB), a next generation enhanced Node B (ng-eNB), or a network node. The terms user device and user equipment (UE) may be used interchangeably. ABS may also include or may be referred to as a RAN (radio access network) node, and may include a portion of a BS or a portion of a RAN node, such as (e.g., such as a centralized unit (CU) and/or a distributed unit (DU) in the case of a split BS). At least part of the functionalities of a BS (e.g., access point (AP), base station (BS) or (e)Node B (eNB), BS, RAN node) may also be carried out by any node, server or host which may be operably coupled to a transceiver, such as a remote radio head. BS (or AP) 134 provides wireless coverage within a cell 136, including to user devices (or UEs) 131, 132, 133 and 135. Although only four user devices (or UEs) are shown as being connected or attached to BS 134, any number of user devices may be provided. BS 134 is also connected to a core network 150 via a S1 interface or NG interface 151. This is merely one simple example of a wireless network, and others may be used.

A base station (e.g., such as BS 134) is an example of a radio access network (RAN) node within a wireless network. A BS (or a RAN node) may be or may include (or may alternatively be referred to as), e.g., an access point (AP), a gNB, an eNB, or portion thereof (such as a centralized unit (CU) and/or a distributed unit (DU) in the case of a split BS or split gNB), or other network node. For example, a BS (or gNB) may include: a distributed unit (DU) network entity, such as a gNB-distributed unit (gNB-DU), and a centralized unit (CU) that may control multiple DUs. In some cases, for example, the centralized unit (CU) may be split or divided into: a control plane entity, such as a gNB-centralized (or central) unit-control plane (gNB-CU-CP), and an user plane entity, such as a gNB-centralized (or central) unit-user plane (gNB-CU-UP). For example, the CU sub-entities (gNB-CU-CP, gNB-CU-UP) may be provided as different logical entities or different software entities (e.g., as separate or distinct software entities, which communicate), which may be running or provided on the same hardware or server, in the cloud, etc., or may be provided on different hardware, systems or servers, e.g., physically separated or running on different systems, hardware or servers.

As noted, in a split configuration of a gNB/BS, the gNB functionality may be split into a DU and a CU. A distributed unit (DU) may provide or establish wireless communications with one or more UEs. Thus, a DUs may provide one or more cells, and may allow UEs to communicate with and/or establish a connection to the DU in order to receive wireless services, such as allowing the UE to send or receive data. A centralized (or central) unit (CU) may provide control functions and/or data-plane functions for one or more connected DUs, e.g., including control functions such as gNB control of transfer of user data, mobility control, radio access network sharing, positioning, session management etc., except those functions allocated exclusively to the DU. CU may control the operation of DUs (e.g., a CU communicates with one or more DUs) over a front-haul (Fs) interface.

According to an illustrative example, in general, a BS node (e.g., BS, eNB, gNB, CU/DU, . . . ) or a radio access network (RAN) may be part of a mobile telecommunication system. A RAN (radio access network) may include one or more BSs or RAN nodes that implement a radio access technology, e.g., to allow one or more UEs to have access to a network or core network. Thus, for example, the RAN (RAN nodes, such as BSs or gNBs) may reside between one or more user devices or UEs and a core network. According to an example embodiment, each RAN node (e.g., BS, eNB, gNB, CU/DU, . . . ) or BS may provide one or more wireless communication services for one or more UEs or user devices, e.g., to allow the UEs to have wireless access to a network, via the RAN node. Each RAN node or BS may perform or provide wireless communication services, e.g., such as allowing UEs or user devices to establish a wireless connection to the RAN node, and sending data to and/or receiving data from one or more of the UEs. For example, after establishing a connection to a UE, a RAN node (e.g., BS, eNB, gNB, CU/DU, . . . ) may forward data to the UE that is received from a network or the core network, and/or forward data received from the UE to the network or core network. RAN nodes (e.g., BS, eNB, gNB, CU/DU, . . . ) may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node or BS may perform. A base station may also be DU (Distributed Unit) part of IAB (Integrated Access and Backhaul) node (a.k.a. a relay node). DU facilitates the access link connection(s) for an IAB node.

A user device (user terminal, user equipment (UE), mobile terminal, handheld wireless device, etc.) may refer to a portable computing device that includes wireless mobile communication devices operating either with or without a subscriber identification module (SIM) (which may be referred to as Universal SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, and a multimedia device, as examples, or any other wireless device. It should be appreciated that a user device may also be (or may include) a nearly exclusive uplink only device, of which an example is a camera or video camera loading images or video clips to a network. A user device may be also MT (Mobile Termination) part of IAB (Integrated Access and Backhaul) node (a.k.a. a relay node). MT facilitates the backhaul connection for an IAB node.

In LTE (as an illustrative example), core network 150 may be referred to as Evolved Packet Core (EPC), which may include a mobility management entity (MIME) which may handle or assist with mobility/handover of user devices between BSs, one or more gateways that may forward data and control signals between the BSs and packet data networks or the Internet, and other control functions or blocks. Other types of wireless networks, such as 5G (which may be referred to as New Radio (NR)) may also include a core network (e.g., which may be referred to as 5GC in 5G/NR).

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), massive MTC (mMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of 10-5 and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to an eMBB UE (or an eMBB application running on a UE).

The various example embodiments may be applied to a wide variety of wireless technologies or wireless networks, such as LTE, LTE-A, 5G (New Radio (NR)), cmWave, and/or mmWave band networks, IoT, MTC, eMTC, mMTC, eMBB, URLLC, etc., or any other wireless network or wireless technology. These example networks, technologies or data service types are provided only as illustrative examples.

A standardized a set of operations for supporting beamforming transmission can include beam sweeping, beam measurements and reporting, beam maintenance and/or recovery. Procedures P1, P2, and P3 are the set of processes that are designed for beam management while in connected state. P1, P2, and P3 can be related to a mechanism for downlink beam management in order to better receive the downlink beam (e.g., data). These procedures may be detailed in one or more standard under the broad topic of beam management procedures. P1 can be related to beam selection. In P1, the bases station can sweep a beam(s) and the UE select a best beam and report the beam to the base station. P2 can be related to beam refinement for the base station transmitter (Tx). In P2, the base station refines beam(s) (e.g., sweeping narrower beam over narrower range) and the UE detects the best beam and reports the best beam to the base station. P3 can relate to beam refinement for the UE receiver (Rx). In P3, the base station can fix a beam (e.g., transmit the same beam repeatedly) and the UE can refine the UE's receiver beam. For example, if the UE supports beamforming, the UE can set the spatial filter on the receiver antenna array.

Beam management has evolved to support more advanced configurations such as multi-beam reporting to enable multi-TRPs (total radiated power) and multi-panel configurations. However, the fundamental problem of the beam management procedures is that with a larger number of beams supported by high-dimensional multiple input—multiple output (MIMO) arrays, the CSI-RS measurements and feedback overhead can increase to enable beam selection. In addition, the time required for gNB and UE to complete the beam sweeping and establish the best beam increases accordingly. Thus, limiting the support of low latency communication.

This is mainly due to the frequency of SSB/CSI-RS transmission during procedures P1, P2, P3 that can include: in P1, beam sweeping can be implemented for the gNB to scan the coverage area periodically transmitting SSBs with wide angular beams. Conversely, the UE scans different SSBs to identify the best beam and corresponding time/ frequency resources on which requesting access; in P2, the gNB can perform beam refinement transmitting CSI-RSs with narrow beams to identify a more precise direction towards the UE after establishing the wide beam in P1; and in P3, beam refinement can be implemented at the UE side to scan a set of Rx narrow beams while the gNB transmits CSI-RSs using the best beam identified in P2. The procedures P1, P2 and P3, can be executed sequentially to establish the data transmission between gNB and UE, and in case of beam failure and recovery are fully repeated. In addition, P2 and P3 can be repeated periodically for beam maintenance.

Figure 2A:
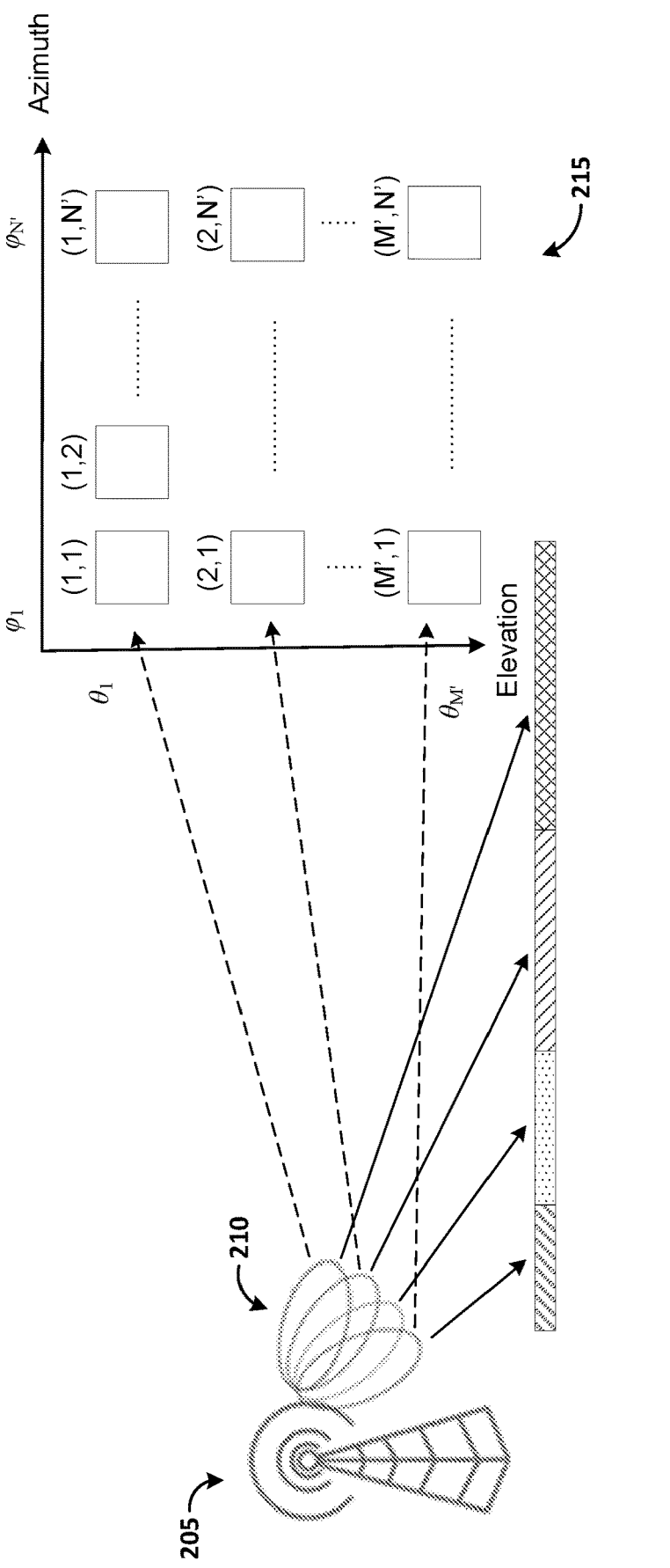
FIG. 2A is a diagram illustrating a cell coverage area and beam pattern according to an example embodiment.

FIG. 2A is a diagram illustrating a cell coverage area and beam pattern according to an example embodiment. FIG. 2A shows a mapping between the cell coverage and the elevation beam angles in order to illustrate the relationship between the cell coverage area and the beam layout. As shown in FIG. 2A, a bases station 205 can generate a plurality of beams 210 having a beam pattern 215. In an example implementation, the beams with elevation angle $\theta_1$ will point to far area of the cell and these beams will serve the largest area. In addition, the beams with elevation angle $\theta_M$, will serve near area of the cell and the serving area is relatively small. Note the cell coverage will be mostly determined by the beams with elevation angle $\theta_1$.

With regard to a refined beam codebook, given, for example, a N×M 2D planar antenna array deployed in the base station, the base station (e.g., GoB #2) refined beam codebook design can be based on DFT beams. The (m,n)-th Tx beam in the base station's refined TX beam codebook (e.g., GoB #2) is denoted $V_{m,n}$ and can be expressed as:

$$V_{m,n} = v_{m,n} \otimes x_m$$

$$x_m = \frac{1}{\sqrt{M}} \left[ 1, e^{\frac{j2\pi f_c d_{ele} sin\theta_m}{c}}, \ldots, e^{\frac{j2\pi f_c d_{ele} sin\theta_m (M-1)}{c}} \right]^T$$

$$v_{m,n} = \frac{1}{\sqrt{N}} \left[ 1, e^{\frac{j2\pi f_c d_{az} sin\phi_n cos\theta_m}{c}}, \ldots, e^{\frac{j2\pi f_c d_{az} sin\phi_n cos\theta_m (N-1)}{c}} \right]^T$$

where $\theta_m \in [\theta_1, \theta_{M'}]$, $\phi_n \in [\phi_1, \phi_{N'}]$ are the elevation angles and azimuth angles respectively, and $\theta_m = \theta_1 + (m-1)$ $(\theta_{M'}, -\theta_1)/M'$, $\phi_n = \phi_1 + (n-1)(\phi_{N'}, -\phi_1)/N'$ with $1 \leq n \leq N'$ and $1 \leq m \leq M'$. $x_m$, $v_{m,n}$ are the elevation beam vector and azimuth beam vector respectively, and $d_{ele}$, $d_{az}$ are the antenna element distance in elevation and azimuth domain respectively.

Denote the refined beam codebook as $\mathcal{B}_{refined} = \{V_{1,1}, V_{2,1}, \ldots, V_{M',N'}\}$, the mapping between the refined beam pattern and the elevation/azimuth beam angles is shown as, for example, the beam pattern 215.

FIG. 2B is a block diagram illustrating a machine learning based beam prediction in the spatial domain data flow according to an example embodiment. As shown in FIG. 2B, a ML model 225 takes an input 220 and generates (e.g., predicts) an output 230. The input 220 can include a subset of beam RSRP measurements. The subset of beam RSRP measurements can be associated with a grid of beams (shown as GoB #1). The input 220 can include extra information. For example, the extra information can include UE position, beam pointing angles for the measured beams, beam indexes for the measured beams, and/or the like. The output 230 can include a prediction of the best beam probability for the beams in a grid of beams (shown as GoB #2). The grid of beams associated with the input 220 can be the same or different than the grid of beams associated with the output 230. The output 230 can include a predicted RSRP for the beams in the grid of beams (shown as GoB #2).

The purpose for supporting machine learned-based beam management can be an overhead savings and latency reduction. For example, the machine learned algorithms can enable predicting the serving beam for different UE locations and time instances, thus avoiding measuring the actual beam quality and saving those resources to be employed for data transmission. In addition, beam scanning operations like those performed in P1, P2 and P3 can be time inefficient and may not be scalable when the size of antenna arrays increases. Therefore, machine learned algorithms can replace sequential beam scanning by recommending a reduced set of beams likely to contain the best beam index of the full scan.

The use cases for machine learned-based beam management can include beam prediction in time and/or spatial domain and beam selection accuracy improvement. Beam prediction in time can refer to the broad range of machine learned approaches that predict the next beam to use. Therefore, the machine learned approaches can predict the best beam to use in successive time instances. In addition, spatial domain machine learned approaches can infer the best beam in different spatial locations. Finally, the machine learned approaches can improve beam selection accuracy taking into consideration system performance aspects such as reliability and outage, targeting more specific applications.

In the example implementation of FIG. 2B, the RSRP measurements of a subset of the Tx beam in the base station (e.g., GoB #1) may be used to predict the best Tx beam for the base station (e.g., GoB #2) at the UE. Accordingly, measuring all Tx beams for the grid of beams (e.g., GoB #2) can be avoided. The grid of beams (e.g., GoB #2) can be the same as GoB #1 in one use case (e.g., single TRP) where the beams are measured and predicted from the same beam codebook. The grid of beams (e.g., GoB #2) can be different from grid of beams (e.g., GoB #1) in another use case. For example, the grid of beams (e.g., GoB #1) and the grid of beams (e.g., GoB #2) can be from a single TRP and the grid of beams (e.g., GoB #1 and GoB #2) can have different beamwidth granularities where the grid of beams (e.g., GoB #1) can be a wide beam codebook (including beams with wider beamwidths) and the grid of beams (e.g., GoB #2) can be a refined beam codebook (including beams with narrower beamwidths, e.g., the beams in GOB #2 have narrower beamwidths than the beams in GOB #1), and/or the grid of beams (e.g., GoB #1 and GoB #2) can be from different TRPs.

Figures 3A, 3B, 3C, 3D:
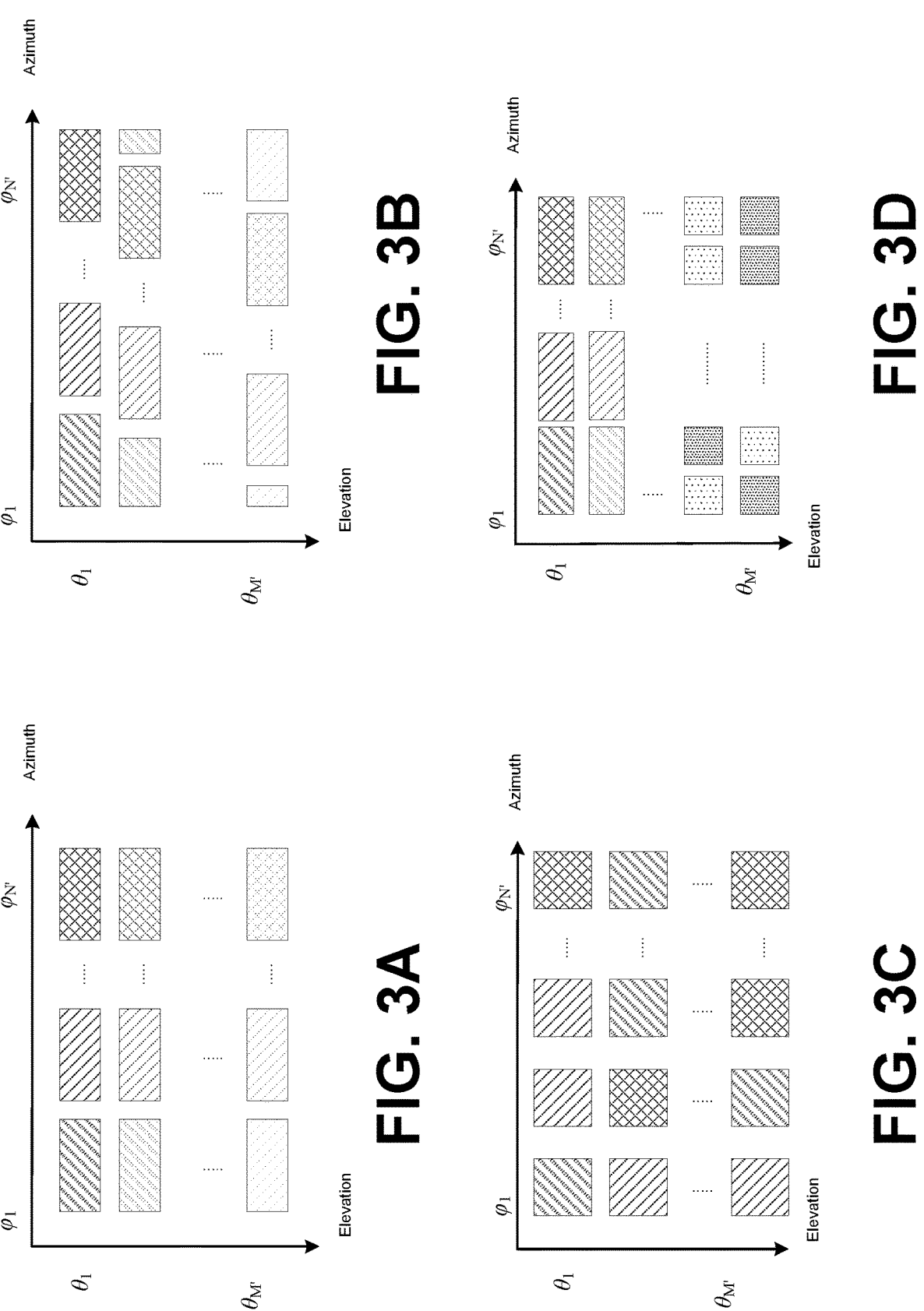
FIGS. 3A, 3B, 3C, and 3D are block diagrams illustrating wide beam patterns according to an example embodiment.

A technique used to formulate a wide beam codebook is to start with the narrow beam codebook (e.g., a DFT-based codebook) and for each beam, flatten the azimuth angles and keep the elevation angle. For example, the technique can include linearly combining the refined beams by multiplying phase coefficients only. The wide beam can be written expressed as:

$$V_{m,l}^{wide} = \frac{1}{\sqrt{P}} \sum_{n=n_{k_l}'}^{n_{k_l}'+P-1} v_{m,n} \otimes x_m e^{j\omega n}, \; n_{k_l}' \in S_L,$$

$$S_L = \{n_1', n_2', \ldots, n_{N'}'\} \text{ with } n_i' = i$$

$$\text{and } k_l = (l-1)*P+1, l \in \left[1, N'/P\right]$$

and $\omega \in R$ is the coefficient to achieve the constant beam-forming gain for $V_{m,l}^{wide}$. $S_L$ is a azimuth beam index set defining the order to combining the azimuth beams as a wide beam, $k_l$ is the index of the elements in $S_L$. For example, if $N'=8$ and $P=4$, then $k_l \in [1,5]$ with $l \in \{1, 2\}$, $S_L = \{1, 2, \ldots, 8\}$, and $\{v_{m,1}, v_{m,2}, v_{m,3}, v_{m,4}\}$, $\{v_{m,5}, v_{m,6}, v_{m,7}, v_{m,8}\}$ can be combined as wide beams $V_{m,1}^{wide}$ and $V_{m,2}^{wide}$ respectively. The wide beam codebook can be denoted as $\mathcal{B}_{wide} = \{V_{1,1}^{wide}, V_{1,2}^{wide}, \ldots, V_{M',N'/P}^{wide}\}$. An example of beam pattern for $\mathcal{B}_{wide}$ is shown in FIG. 3A which illustrates a wide beam pattern(s) according to an example embodiment. To maximize the beamforming gain of $V_{m,l}^{wide}$, $\omega$ can be designed as:

$$\omega^* = \arg\min_{\omega \in \left[-\frac{\pi}{N'}, \pi\left(1-\frac{1}{N'}\right)\right]} \mathrm{var}\left(\left\{V_{m,n}^H V_{m,1}^{wide}\right\}_{n=1,2,\ldots,P}\right)$$

After getting $\omega^*$, apply it for formulating all $V_{m,l}^{wide}$.

Example implementations describe a machine learned technique for refined beam ($\mathcal{B}_{refined}$) prediction with wide beam measurements; other wide beam designs that will provide better refined beam prediction compared to the wide beam shown in, for example, FIG. 3A; and signaling of configuration of wide beam with CSI-RS resource(s).

Example implementations include an algorithm for generating a wide beam codebook that can improve the performance of refined beam prediction based on wide beam measurements. The wide beam codebook may contain one or more beams that have a pattern with multiple beam directions each pointing to different TX directions, and the different TX directions may each correspond to different preferred RX beams in the UE side. A beam with multiple beam directions (e.g., multiple distinct beam pattern peaks each having roughly similar gain but pointed in distinctly different directions) can be referred to as a divided wide beam. Example implementations include an algorithm for predicting a refined beam based on a neural network structure. The network structure or model can apply the measurements from the wide beams to predict the best refined beam.

Example implementations include an RS resource configuration technique for the designed wide beam that may have multiple corresponding preferred RX beam directions at the UE side. In one embodiment, a wide beam with multiple TX directions may be configured by one CSI-RS resource with multiple type-D QCL info, or no type-D QCL info, or one type-D QCL info. In another embodiment, a wide beam with multiple TX directions may be configured by multiple CSI-RS resources with multiple type-D QCL info. In another embodiment, a wide beam with multiple TX direction may be configured by one SSB resource. The configuration of the multiple TX direction wide beam may or may not be transparent to the specification. According to the multiple TX direction wide beam configuration, UE may choose the corresponding RX beam accordingly.

Below defines terms algorithm basis:

I. Beam Codebooks

Define an azimuth beam codebook $\mathcal{B}_{az} = \{v_{1,1}, v_{2,1}, \ldots, v_{M',N'}\}$ and an elevation beam codebook $\mathcal{B}_{ele} = \{x_1, x_2, \ldots, x_{M'}\}$, where. $x_m$, $v_{n,m}$ are the elevation beam vector and azimuth beam vector respectively. Define the Kronecker product between the beam codebook as:

$$\mathcal{B}_{az} \otimes \mathcal{B}_{ele} = \{v_{m,n} \otimes x_m\} \forall n,m$$

where $v_{n,m} \otimes x_m$ is regular Kronecker product between vectors. Define a refine beam codebook $\mathcal{B}_{refined} = \{V_{1,1}, V_{2,1}, \ldots, V_{M',N'}\} = \mathcal{B}_{az} \otimes \mathcal{B}_{ele}$ and $V_{m,n} = v_{m,n} \otimes x_m$.

II. Beam Codebook Index Matrix

Define the following beam indexes matrix as:

$$\mathcal{T} = \begin{pmatrix} i_{1,1} & \cdots & i_{1,N'} \\ \vdots & \ddots & \vdots \\ i_{M',1} & \cdots & i_{M',N'} \end{pmatrix} \in \mathcal{R}^{M' \times N'}$$

Define the beam index notations as:
1. $\mathcal{B}_{refined}(i_{m,n}) = V_{m,n}$ for a single beam
2. $\mathcal{B}_{refined}(\mathcal{T}(m,:)) = \{V_{m,1}, V_{m,2}, \ldots, V_{m,N'}\}$ for the beams share the same azimuth angles
3. $\mathcal{B}_{refined}(\mathcal{T}(:, n)) = \{V_{1,n}, V_{2,n}, \ldots, V_{M',n}\}$ for the beams share the same elevation angles

III. Matrix Circular Shift on Row/Column

Define an operation $S_{row}(m, \Delta_m)$ that will circularly shift the m-th row of a matrix from left to right by $\Delta_m$. Define an operation $S_{col}(n, \Delta_n)$ that will circularly shift the n-th column of a matrix from up to down by $\Delta n$.

An example of applying the circular shift operations $S_{col}(1,1)$ and $S_{row}(1,1)$ on beam indexes matrix $\mathcal{T}$ is shown in the following:

$$S_{col}(1,1) \circ S_{row}(1,1) \circ \mathcal{T} = \begin{pmatrix} i_{M',1} & \cdots & i_{1,1} \\ \vdots & \ddots & \vdots \\ i_{1,N'} & \cdots & i_{M',N'} \end{pmatrix}$$

where $\circ$ denotes for function composition.

IV. Matrix Entries Random Shuffle

Define an operation $RS(m_1, m_2, n_1, n_2)$ that randomly shuffles the matrix entries within the row range $m1 \leq m \leq m_2$ and within the column range $n1 \leq n \leq n_2$.

V. One Dimensional Wide Beam Construction

Define a Wide beam construction method $W C(m, P, \omega, I^{K,P})$ that has the following operations:
a. $W C(m, P, \omega, I^{K,P})$ operates on the beam indexes from the m-th row of the refined beam indexes matrix.
b. $W C(m, P, \omega, I^{K,P})$ constructs total K/P Wide beams, and each wide beam is constructed from P refined beams with nonoverlapping refined beam indexes.
c. $I^{K,P}$ is a K/P×K matrix with entries are ones or zeros. Each row in $I^{K,P}$ can be expressed as $$I^{KP}(l, :) = S_{row}(l, (l-1)*P) \circ e$$

where e is a 1×K vector with the first P elements are ones and the remaining elements are zeros. For example, if P=4 and K=8, I is a 2×8 matrix with first row is [1,1,1,1,0,0,0,0] and the second row is [0,0,0,0,1,1,1,1].

d. W $C_{az}$ (m, P, ω, $I^{K,P}$) construct each wide beam based on the following expression:

$$V_{m,l}^{wide} = \frac{1}{\sqrt{P}} \sum_{n=1}^{K} v_{m,n} \otimes x_m e^{j\omega n} I_{l,n}^{K,P}$$

where $$I_{l,n}^{K,P}$$

is the (l,n) element in $I^{K,P}$.

e. W $C_{ele}$ (n, P, ω, $I^{K,P}$) construct each wide beam based on the following expression:

$$V_{l,n}^{wide} = \frac{1}{\sqrt{P}} \sum_{m=1}^{K} v_{m,n} \otimes x_m e^{j\omega m} I_{l,m}^{K,P}$$

where $$I_{l,m}^{K,P}$$

is the (l,m) element in $I^{K,P}$.

f. If ω is not zero in W $C_{az}$ (m, P, ω, $I^{K,P}$) or W $C_{ele}$ (m, P, ω, $I^{K,P}$), one choice of the optimal ω* can calculated by:

$$\omega^* = \arg \min_{\omega \in [-\pi, \pi]} \text{var}\left( \left\{ V_{m,n}^{H} V_{m,1}^{wide} \right\}_{n=1,2,\dots,P} \right).$$

Figure 4:
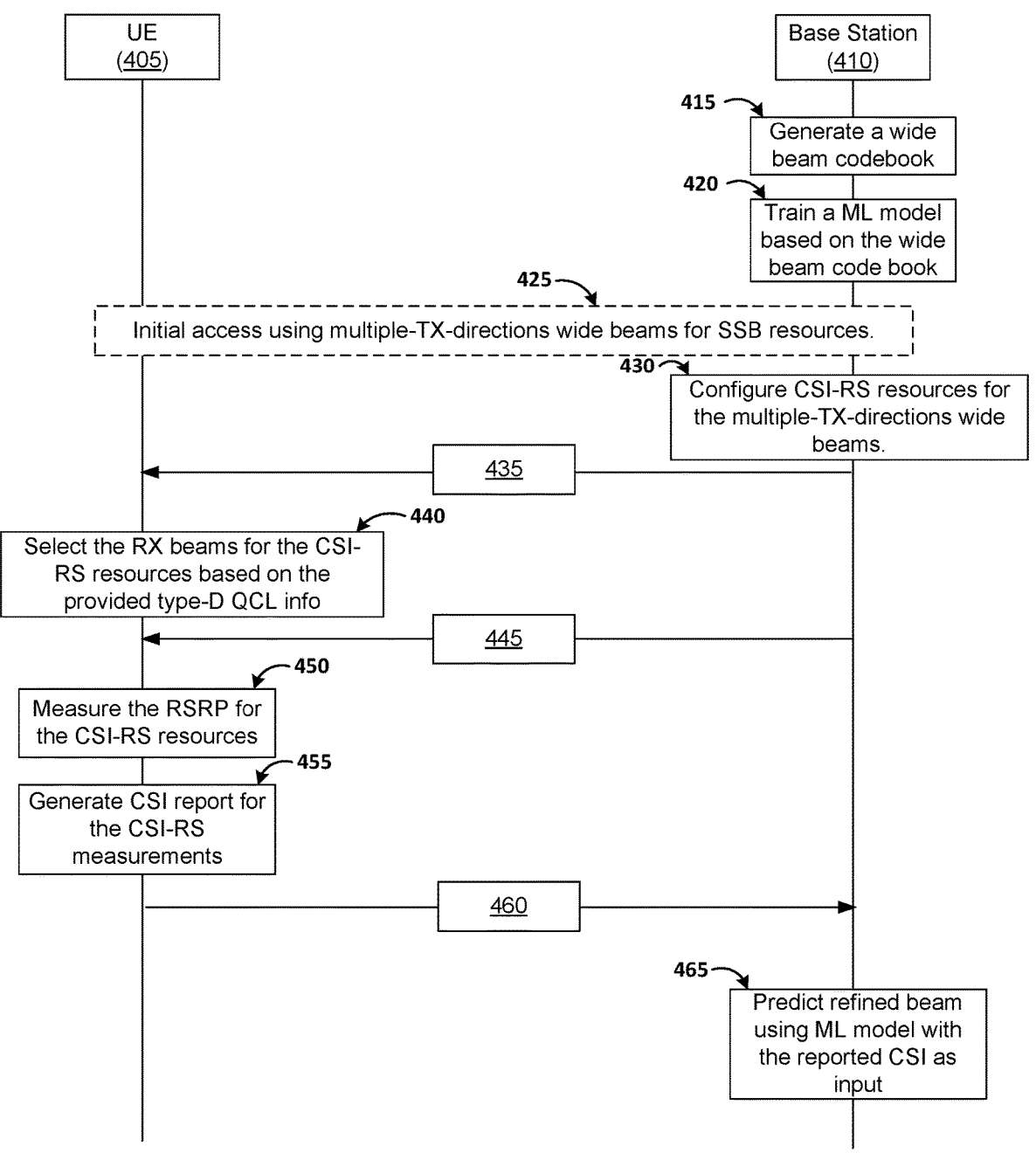
FIG. 4 is a flow diagram illustrating refined beam generation according to an example embodiment.

FIG. 4 is a flow diagram illustrating refined beam generation according to an example embodiment. As shown in FIG. 4, a wireless system can include a UE 405 and a base station 410. The UE 405 and/or the base station 410 can be configured to communicate (e.g., wirelessly communicate) between each other. For example, the UE 405 and the base station 410 can be configured to communicate messages, signals and/or the like between each other. For example, the UE 405 and/or the base station 410 can be configured to communicate using a wireless standard as described above. In an example implementation, in block 415 the base station 410 can generate a wide beam codebook. The wide beam codebook can be determined using Algorithm-1 (below). The wide beam codebook can have multi-TX-direction wide beam(s) in at least a portion of the wide beam elements.

---

Algorithm-1

---

1. Provide the desire coverage angle range [$\theta_1$, $\theta_2$] for azimuth and [$\phi_1$, $\phi_2$] for elevation.

2. Provide the angle quantization step $\Delta_{az}$ and $\Delta_{ele}$. Utilize $\Delta_{az}$ and $\Delta_{ele}$ with the angle ranges to construct the refined angle grid as
   - Angles for azimuth $\Theta = [\theta_1, \theta_1 + \Delta_{az}, \cdots, \theta_2 - \Delta_{az}, \theta_2]$. Assuming there are N angles in total in azimuth domain.
   - Angles for elevation $\Phi = [\phi_1, \phi_1 + \Delta_{ele}, \cdots, \phi_2 - \Delta_{ele}, \phi_2]$. Assuming there are M angles in total in elevation domain.
   - A beam index pair (n, m) indicates the n-th azimuth angle and the m-th elevation angle. n ∈ [1, N] and m ∈ [1, M]. Given all beam index pairs, the beam index matrix $\mathcal{I}$ can be constructed (see the expression in II above).

3. Given the following beam index matrix permutation in III and IV above
   - Row circular shift $S_{row}$ (m, $\Delta_m$)
   - Column circular shift $S_{col}$ (n, $\Delta_n$)
   - Random shuffle RS($m_1$, $m_2$, $n_1$, $n_2$)

Determine $\Delta_m$, $\Delta_n$, $m_1$, $m_2$, $n_1$, $n_2$. Apply one or multiple of the above permutation methods to the beam index matrix.

4. Based the [$\Theta$, $\Phi$], follow I above to generate the refined beam codebook $\mathcal{B}_{refined}$.

5. Choose P as number of refined beams that will be combined as one wide beam.

6. Select $WC_{az}$(m, P, ω, $I^{K,P}$) to combine refined beams in $\mathcal{B}_{refined}$ for azimuth domain or select $WC_{ele}$(n, P, ω, $I^{K,P}$) to combine refined beams in $\mathcal{B}_{refined}$ for elevation domain. The $WC_{az}$(m, P, ω, $I^{K,P}$) and $WC_{ele}$ (n, P, ω, $I^{K,P}$) are define in V above.

7. Calculate the optimum ω if it is needed. The optimization method of ω is provided in V above.

---

In block 420, the base station 410 can train a machine learned model based on the wide beam codebook. The machine learned model can be used for refined beam prediction based on the generated multi-TX-direction wide beam codebook. The machine learned model can be trained offline. The machine learned model can be trained using Algorithm-2 (below).

---

Algorithm-2

---

1.  Initializing the values of layer weights {$W_i$} and {$b_i$} for all NN layers.
2.  Initializing the learning rate $\eta$.
3.  While stopping criteria (i.e., iteration <=maximum epoch number) is not met, do
    • Take a minibatch of n data samples from the training dataset including wide beam measurements.
    • Compute the gradient estimate for {$W_i$} and {$b_i$} and update the weight the coefficients with Adam algorithm.
    • Update the learning rate $\eta$ if schedular is configured.
    • Save the NN model coefficients.
4.  End while
5.  Pick the model from the saved models that has the best beam prediction accuracy or minimum RSRP prediction error with the test data set.

---

The training dataset can include wide beam measurements. The wide beam measurements can be historical wide beam measurements stored (e.g., in a memory) at the base station. The wide beam measurements can be computer generated data stored at the base station. The wide beam measurements can be data collected at other base stations stored at the base station. The training dataset can be selected based on the generated wide beam codebook. The training dataset can be based on any combination of the above and/or similar techniques.

In block 425, an initial access using multiple-TX-directions wide beams for SSB resources. A multiple-TX-direction wide beam (or divided wide beam) can be a beam that has two or more beam pattern peaks of roughly similar gain but pointed in different angular directions. The transmit beam weights that can create a divided wide beam can be formed for example by a weighted sum of two DFT vectors whose beam patterns point in two substantially different directions. The base station 410 can also determine a wide beam codebook from Algorithm-1 above that has contiguous wide beam angle spread, for example, a single beam peak with a wide beamwidth, in contrast to the divided wide beam where the there are multiple beam peaks each in a different direction. In addition, any type of wide beam codebook may be used in the initial access. In an example implementation, multiple-TX-directions and divided can be used interchangeably. Therefore, block 425 could be written as an initial access using divided wide beams for SSB resources.

In block 430, the base station 410 can configure CSI-RS resources for the multiple-TX-directions wide beams. In an example implementation, one CSI-RS resource with multiple TCI states and each configured TCI state can include a type D QCL-info. For example, the CSI-RS resource can be configured with multiple TCI states and each configured TCI state may include a type D QCL-info each with a different source reference signal. The multiple TCI states configuration can indicate that the CSI-RS resource is transmitted with a single beam that points to more than one direction (a divided wide beam where, e.g., each direction can correspond to the direction of the source reference signal). The different TX beam directions pointed to by the single divided beam correspond to the directions pointed to by the TX beam that transmits the respective source reference signal, and the UE can have a different corresponding optimum RX beam for each of those different TX beam directions. If no P3 is to be performed, the CSI-RS resource can be processed (e.g., P3 involves a repetition process for transmitting the CSI-RS resource), and then the UE 405 can choose a RX beam for the multiple QCL-type D TCI states to maximize the RSRP. For example, the CSI-RS resource may not contain any TCI state with type D QCL-info. If no P3 is to be performed, the UE 405 can choose a RX beam for receiving such CSI-RS resource. If no P3 is to be performed for all the CSI-RS resources that have no type D QCL-info, the UE can choose the same RX beam for all these CSI-RS resources. For example, the base station 410 (or other network element) can configure the CSI-RS resource a TCI state with type D QCL-info. Although the CSI-RS resource may be transmitted in a beam that points to more than one direction, the base station 410 can determine the corresponding reference signal for the type D QCL-info based on previous RSRP reports from the UE 405.

In an example implementation, multiple CSI-RS resources can be configured with the same resource mapping and the same sequence scrambling identity (scramblingID). For example, the base station 410 (or other network element) can configure multiple CSI-RS resources with the same CSI-RS-ResourceMapping and same scramblingID. These CSI-RS resources may have different reference signals for their type D QCL-info. The CSI-RS resources with the same CSI-RS-ResourceMapping (e.g., same REs and symbols) and same scramblingID (e.g., same sequence) can be transmitted together as one beam (one CSI-RS). The base station 410 can further RRC configure a group ID for a CSI-RS resource. Different CSI-RS resources with different reference signals for the type D QCL-info may share the same group ID. The CSI-RS resources with the same group ID will be transmitted with same CSI-RS-ResourceMapping and same scramblingID. If no P3 is to be performed for these CSI-RS resources, then the UE 405 can choose a RX beam to receive the CSI-RS resources to maximize the RSRP.

In block 435 the base station 410 communicates a message 435 to the UE 405. The message 435 can include the configured CSI-RS resources. In block 440, the UE 405 can select the RX beams for the CSI-RS resources based on the provided type-D QCL information. If no RX beam refinement is configured (e.g., P3), the UE 405 can select the best RX beam that can maximize the RSRP. If RX beam refinement is configured the UE 405 can select the RX beams based on the CSI-RS resource configuration received in the message 435.

In an example implementation, one CSI-RS resource with multiple TCI states and each configured TCI state can include a type D QCL-info. For example, the CSI-RS resource can be configured with multiple TCI states and each configured TCI state may include a type D QCL-info each with a different source reference signal. The multiple TCI states configuration can indicate that the CSI-RS resource is transmitted with a beam that points to more than one direction (e.g., each direction can correspond to the direction of the TX beam that transmitted the source reference signal). The TX beam that transmitted the different beam directions can result in a different corresponding optimum RX beam in UE side. The CSI-RS resource can be processed (e.g., repetition process for the CSI-RS resource), then the UE 405 can select a RX beam for the multiple QCL-type D TCI states to maximize the RSRP. For example, the CSI-RS resource may not contain any TCI state with type D QCL-info. The UE 405 can select a RX beam for receiving such CSI-RS resource. For all the CSI-RS resources that have no type D QCL-info, the UE 405 can select the same RX beam for all these CSI-RS resources.

In an example implementation, multiple CSI-RS resources can be configured with the same resource mapping and the same sequence scramblingID. For these CSI-RS resources, the UE 405 can select a RX beam to receive the CSI-RS resources to maximize the RSRP. In an example implementation, one SSB resource can represent one multiple-TX-direction wide beam (or divided wide beam). For example, a SSB resource can be transmitted with a single TX beam that has multiple beam peaks each pointing to different TX directions, each of which may correspond to a different best RX beam for each of the pointed TX directions. The UE 405 can select a RX beam for the SSB resource during the initial access to maximize the RSRP.

In block 445, the base station 410 can transmit the CSI-RS resources with the multiple-TX-directions wide beams. For example, the base station 410 can transmit the CSI-RS resources using the configured multi-TX-direction wide beam codebook (or divided wide beam codebook). The CSI-RS resources can be a signal configured specifically and dedicated for UE 405 UE. However, the same CSI-RS resource may be configured to many or all UEs served by the base station 410. The sequence used for CSI-RS can be a PN sequence and the initialization access (block 425) can be configured by RRC signalling. In the time domain, CSI-RS can be configured for transmission with different periodicity, ranging from a period equating to, for example, two-per-frame every eighth frame. Furthermore, for a given CSI-RS periodicity, the subframe in which CSI-RS is transmitted can be configured using a subframe offset. In subframes in which CSI-RS is to be transmitted, the CSI-RS can be transmitted in every resource block in the frequency domain. In other words, a CSI-RS transmission can cover the entire cell bandwidth. The CSI-RS is used only for measurements and not for demodulation or synchronization.

In block 450, the UE 405 can measure the RSRP for the CSI-RS resources. For example, the UE 405 can measure the CSI (e.g., RSRP) with proper RX beams for the CSI-RS resources. The CSI measurements can include measurements of channel properties and an interference level(s). The channel properties can include gain, quality, interference, channel strength, resource information, and/or the like. In block 455, the UE 405 can generate a CSI report for the CSI-RS measurements. In block 460 the UE 405 can communicate a message 460 to the base station 410. The message 460 can include the CSI report. In block 465, the base station 410 can predict refined beam(s) using the machine learned model with the reported CSI as input. For example, using the trained machine learned model, the CSI report can be used to predict refined beam(s) or refined beam codebook P1. In other words, rather using the resources involved with sweeping beams, the refined beams (e.g., the GoB #2 mentioned above) can be predicted using the trained machine learned algorithm and the wide beam codebook.

Figure 5:
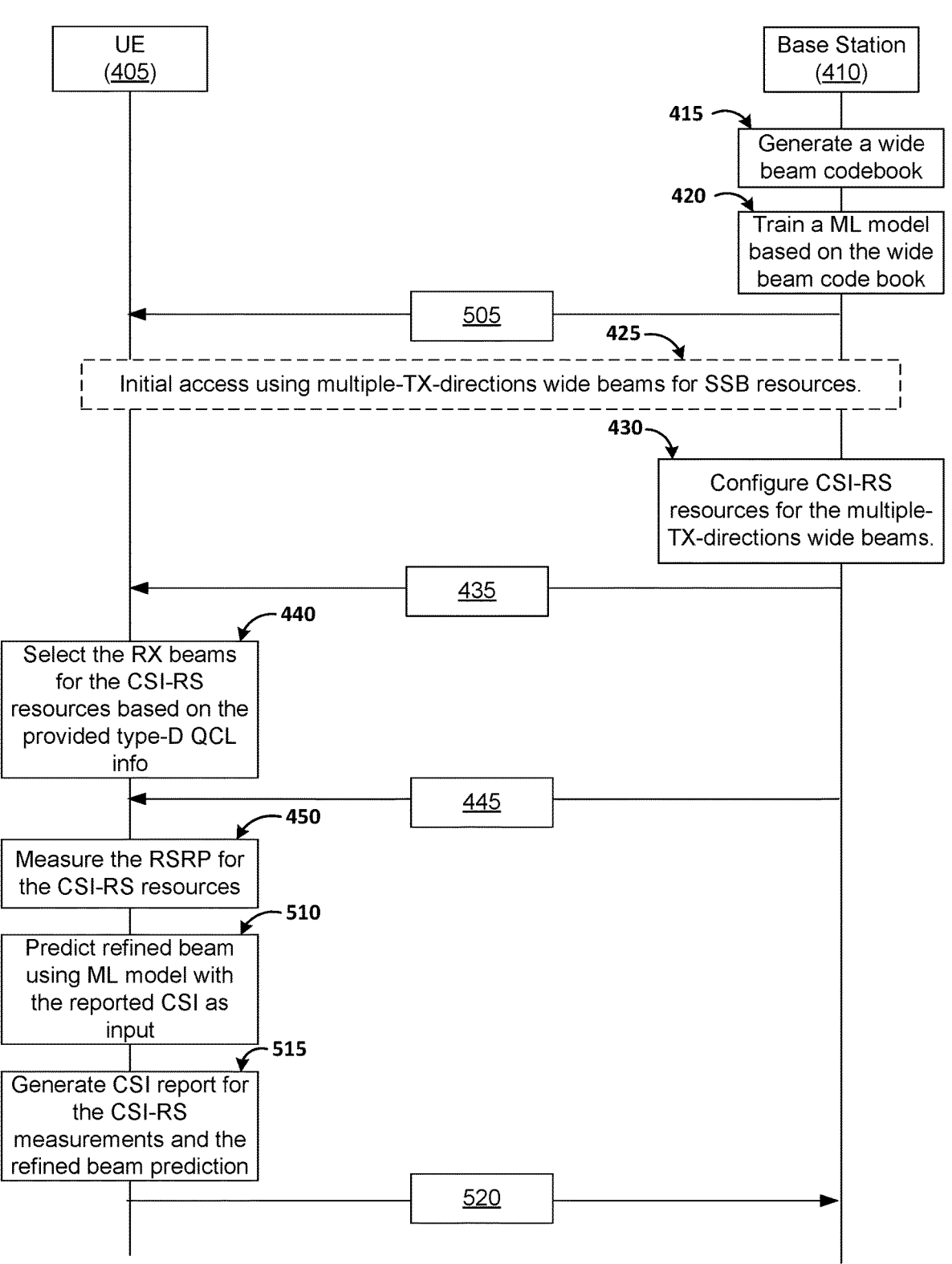
FIG. 5 is a flow diagram illustrating refined beam generation according to an example embodiment.

FIG. 5 is a flow diagram illustrating refined beam generation according to an example embodiment. The example implementation of FIG. 4 shows the machine learning algorithm being trained (block 420) by the base station 410 and used by the base station 410 to predict a refined beam(s) (block 465). By contrast, the example implementation of FIG. 5 shows the machine learning algorithm being trained (block 420) by the base station 410 and used by the UE 405 to predict a refined beam(s) (block 510). Therefore, FIG. 5 includes blocks that are substantially similar to blocks of FIG. 4 which are labelled accordingly.

In block 505, the base station 410 communicates a message 505 to the UE 405. The message 505 can include the trained machine learned model (e.g., as trained by the base station in block 420). In block 510, the UE 405 can predict refined beam(s) using the machine learned model with the reported CSI as input. For example, using the trained machine learned model, the CSI report can be used to predict refined beam(s) or refined beam codebook. In other words, rather using the resources involved with sweeping beams, the refined beams (e.g., the GoB #2 mentioned above) can be predicted using the trained machine learned algorithm and the wide beam codebook.

In block 515, the UE 405 can generate a CSI report for the CSI-RS measurements. The CSI report can also include the predicted refined beam(s) or refined beam codebook (as predicted by the UE 405 using the machine learned model). In block 520 the UE 405 can communicate a message 520 to the base station 410. The message 460 can include the CSI report including the predicted refined beam(s) or refined beam codebook.

Referring back to FIGS. 3A-3D where different fill patterns represent different beams. The corresponding beam pattern for $\mathcal{B}_{wide}$ with P=4 shown in FIG. 3A which illustrates a wide beam pattern(s) according to an example embodiment is described above. Using Algorithm 1, the beam pattern for $\mathcal{B}_{wide}$ with P=4 shown in FIG. 3A can be expressed as:

$$\mathcal{B}_{wide} = \left\{ WC_{az}\left(m, P, \omega^*, I^{N',P}\right) \circ \mathcal{B}_{refined}\left(\mathcal{J}(m, :)\right) \right\}_{\forall m \in \{1 \le m \le M'\}} =$$
$$\left\{ \left[ V^{wide}_{m,1}, V^{wide}_{m,2}, \dots, V^{wide}_{m,N'/P} \right] \right\}_{\forall m \in \{1 \le m \le M'\}}$$

Referring to FIG. 3B, a circular shift can be introduced to the beam indexes matrix. The circular-shifted beam index matrix can be defined as:

$$\mathcal{J}^{CS}_{m,\Delta_m} \triangleq S_{row}(m, \Delta_m) \circ \mathcal{J}$$

The wide beam codebook with row circular shift can be expressed as:

$$\mathcal{B}^{CS,row}_{wide} = \{W \, C_{az}(m, P, \omega^*, I^{N',P}) \circ \mathcal{B}_{refined}($$
$$\mathcal{J}^{CS}_{m,\Delta_m}(m, :))\}_{\forall m \in \{1 \le m \le M'\}}$$

where $\omega^*$ can be calculated the same as the wide beam codebook of FIG. 3A and $\Delta_m$=m−1. An example of $\mathcal{B}^{CS,row}_{wide}$ is shown in FIG. 3B.

In FIG. 3B, the wide beam codebook can preserve the same wide beam design as the wide beam codebook of FIG. 3A for the beams with elevation $\theta_1$. For the beams with elevation angles other than $\theta_1$, at most 2 TX directions can be included for a wide beam in the codebook of FIG. 3B. The cell coverage can be same for both the codebooks of FIG. 3A and FIG. 3B because the coverage performance of the codebooks may be dominated by the coverage provided by the beams in elevation $\theta_1$. As the UE (e.g., UE 405) gets closer to the base station (e.g., base station 410), the channel pathloss may decrease, and the corresponding wide beam in the codebook of FIG. 3B may be split into two (2) directions (divided wide beam). Therefore, the receiving power in the UE should be sufficient because the UE has moved closer to the base station).

Referring to FIG. 3C, a beam index random shuffling can be introduced to the beam indexes matrix. The random-shuffled beam index matrix can be defined as:

$$\mathcal{J}^{RS}_{m_1,m_2,n_1,n_2} \triangleq RS(m_1,m_2,n_1,n_2) \circ \mathcal{J}$$

The wide beam codebook with random shuffling can be expressed as:

$$\mathcal{B}^{RS}_{wide} = \{W \, C_{az}(m,P,0,I^{N',P}) \circ \mathcal{B}_{refined}( \, \mathcal{J}^{RS}_{1,M',1,N'} \\ (m,:))\}_{\forall m \in \{1 \le m \le M'\}}$$

where $\omega=0$ and the refined beam combination can be linear summation.

An example of $\mathcal{B}^{RS}_{wide}$ with P=4 is shown in FIG. 3C.

In FIG. 3C, the wide beam codebook can be split into multiple TX directions. However, in this example implementation the coverage of the cell may be diminished because the beamwidth of the beams in elevation $\theta_1$ may be smaller than the channel angular spread. Therefore, the UE at the cell-edge may receive insufficient TX power to connect to the cell. In FR2 the pathloss may be more severe than FR1. Hence, regarding initial access or SSB resources, the codebook of FIG. 3C may not be useful for some large coverage (e.g., outdoor) scenarios but may be suitable for some scenarios that have small coverage area (e.g., indoor) or less severe channel pathloss. The codebook of FIG. 3C may be used for CSI-RS resources for refined beam prediction.

Referring to FIG. 3D, a circular shift and a beam index random shuffling can be introduced to the beam indexes matrix. The circular shift and random shuffle operation, consider $m_1=M \ge 1$ in $RS(m_1, m_2, n_1, n_2)$, can be defined as:

$$\mathcal{B}^{HY}_{wide} = \{\{W \, C_{az}(m,P,\omega^*,I^{N',P}) \circ \mathcal{B}_{refined}( \\ \mathcal{J}^{CS}_{m,\Delta_m}(m,:))\}_{\forall m \in \{1 \le m < M\}}, \{W \, C_{az}(m,P,0,I^{N',} \\ P) \circ \mathcal{B}_{refined}( \, \mathcal{J}^{RS}_{M,M',1,N'}(m,:))\}_{\forall m \in \{M \le m \le M'\}}\}$$

where $\Delta_m$ is either 0 or $\Delta_m = m-1$. An example of $\mathcal{B}^{HY}_{wide}$ with $\Delta_m=0$, P=4 is shown in FIG. 3D.

In FIG. 3D, the wide beam codebook can be a combination of codebook of FIG. 3B and the codebook of FIG. 3C, and can have the benefits from both codebooks including, for example, providing good cell coverage and being beneficial for refined beam prediction.

Alternatively, the Wide beam codebooks illustrated in FIGS. 3A-3D can each be extended to column-wise refined beam combination by switching W $C_{az}$ (m, P, $\omega$, $I^{K,P}$) to W $C_{ele}$ (n, P, $\omega$, $I^{K,P}$), and, if needed, introducing column-wise circular shift to the beam index matrix as $\mathcal{J}^{CS,T}_{n,\Delta_n} \triangleq S_{col}$ (n, $\Delta_n$) $\circ \mathcal{J}$. For example, the wide beam codebook of FIG. 3B with column circular shift can be expressed as:

$$\mathcal{B}^{CS,col}_{wide} = \{W \, C_{ele}(n,P,\omega^*,I^{M',P}) \circ \mathcal{B}_{refined}( \, \mathcal{J}^{CS,T}_{n,\Delta_n}(:, \\ n))\}_{\forall n \in \{1 \le n \le N'\}}$$

where $\omega^*$ is calculated is similar to $\mathcal{B}^{CS,row}_{wide}$.

Example 1. FIG. 6 is a block diagram of a method of operating a base station according to an example embodiment. As shown in FIG. 6, in step S605 determining, by a base station, a beam coverage in a cell, the beam coverage including angle range for an azimuth and an angle range for an elevation. In step S610 determining, by the base station, an angle quantization step. In step S615 generating, by the base station, a grid of narrow beams based on the angle range and the angle quantization step. In step S620 computing, by the base station, a beam index matrix based on the grid of narrow beams. In step S625 generating, by the base station, a wide beam codebook based on the grid of narrow beams. In step S630 transmitting, by the base station, at least one of a CSI-RS resource and a SSB resource using multiple-TX-directions wide beams based on the wide beam codebook.

Example 2. The method of Example 1, wherein a beam index matrix can specify which narrow beams of the grid of narrow beams can be covered by each wide beam of the wide beam codebook.

Example 3. The method of Example 1 can further include combining two or more narrow beams in the wide beam codebook and calculating combining coefficients for the two or more narrow beams.

Example 4. The method of Example 1 can further include training a machine learned model using the wide beam codebook and a training dataset including wide beam measurements, wherein a stopping criteria is based on a beam prediction accuracy.

Example 5. The method of Example 4 can further include predicting a beam from a refined beam codebook using the machine learned model with wide beam measurements as input.

Example 6. The method of Example 4 can further include communicating, by the base station to a user equipment (UE), the machine learned model and receiving, by the base station to the UE, a beam predicted using the machine learned model.

Example 7. The method of Example 1, wherein the wide beam codebook can include at least one beam that has a pattern with multiple divided beam directions each pointing to different TX directions and the different TX directions can correspond to different preferred RX beams.

Example 8. The method of Example 1 can further include at least one of configuring CSI-RS resources and configuring SSB resources based on the wide beam codebook and communicating the configured CSI-RS resources to a UE.

Example 9. The method of Example 8, wherein the configured CSI-RS resources can include a CSI-RS resource with multiple TCI states and each configured TCI state can include a type D QCL-information.

Example 10. The method of Example 8, wherein the configured CSI-RS resources can include a plurality of CSI-RS resources that are configured with a same resource mapping and a same sequence scrambling identity.

Example 11. FIG. 7 is a block diagram of a method of operating a user equipment according to an example embodiment. As shown in FIG. 7, in step S705 receiving, by a user equipment (UE) from a base station, at least one of a CSI-RS resource configuration a SSB resource configuration configured based on a wide beam codebook that includes at least one beam that has a pattern with multiple divided beam directions each pointing to different TX directions. In step S710 configuring to receive, by the UE, at least one of CSI-RS resources and SSB resources based on at least one of the CSI-RS resources configuration and SSB resource configuration. In step S715 determining, by the UE, a type D QCL-information based on the CSI-RS resources. In step S720 selecting, by the UE, Rx beams for the CSI-RS resources based on the type D QCL-information or the SSB resources.

Example 12. The method of Example 11 can further include measuring, by the UE, RSRP for at least one of the CSI-RS resources and the SSB resources, generating, by the UE, a CSI report based on the measured RSRP, and communicating, by the UE to the base station, the CSI report.

Example 13. The method of Example 11 can further include determining whether the CSI-RS resources include a repetition indication and in response to determining that at least one of the CSI-RS resources and the SSB resources do not include the repetition indication, selecting, by the UE, a best RX beam that can maximize a RSRP measurement.

Example 14. The method of Example 11 can further include receiving, by the UE from the base station, a machine learned model trained using the wide beam codebook and a training dataset including wide beam measurements and predicting a best beam from a refined beam codebook using the machine learned model with RSRP measurements associated with a CSI report.

Example 15. The method of Example 14, wherein the CSI report can include the predicted beam from the refined beam codebook.

Example 16. FIG. 8 is a block diagram of a method of operating a base station according to an example embodiment. As shown in FIG. 8, in step S805 transmitting, by a base station, at least one of CSI-RS resources and SSB resources based on a wide beam codebook that includes at least one beam that has a pattern with multiple divided beam directions each pointing to different TX directions. In step S810 receiving, by the base station from a user equipment (UE), a CSI report including a RSRP for at least one of the CSI-RS resources and the SSB resources. In step S815 predicting, by the base station, a beam associated with a refined beam codebook using a machine learned model with wide beam measurements associated with the CSI report.

Example 17. The method of Example 16 can further include combining two or more narrow beams in the wide beam codebook and calculating combining coefficients for the two or more narrow beams.

Example 18. The method of Example 16 can further include configuring at least one of the CSI-RS resources and the SSB resources based on the wide beam codebook and communicating at least one of the configured CSI-RS resources and the SSB resources to a UE.

Example 19. The method of Example 18, wherein the configured CSI-RS resources can include a CSI-RS resource with multiple TCI states and each configured TCI state can include a type D QCL-information.

Example 20. The method of Example 16, wherein the machine learned model can be trained using the wide beam codebook and a training dataset including wide beam measurements.

Example 21. A non-transitory computer-readable storage medium comprising instructions stored thereon that, when executed by at least one processor, are configured to cause a computing system to perform the method of any of Examples 1-20.

Example 22. An apparatus comprising means for performing the method of any of Examples 1-20.

Example 23. An apparatus comprising at least one processor and at least one memory including computer program code, the at least one memory and the computer program code configured to, with the at least one processor, cause the apparatus at least to perform the method of any of Examples 1-20.

Figure 9:
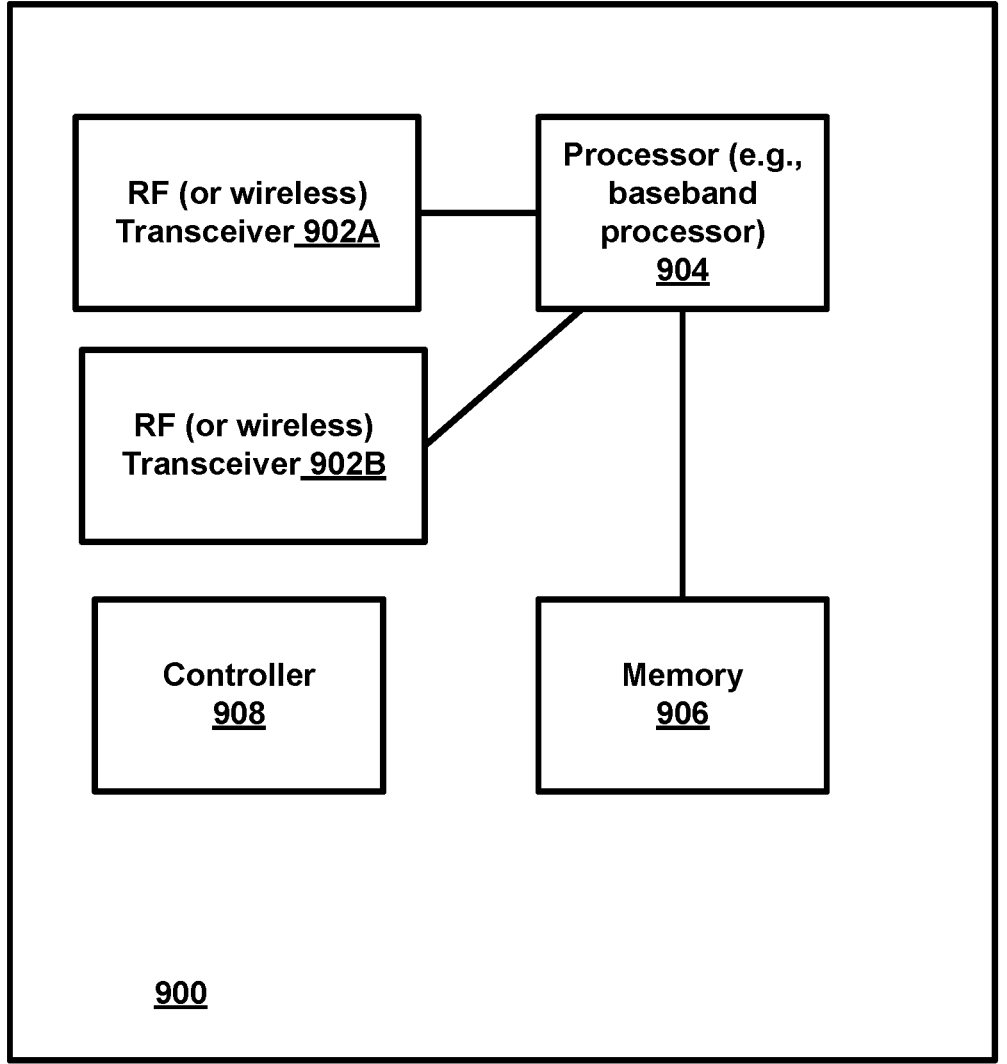
FIG. 9 is a block diagram of a wireless station or wireless node (e.g., AP, BS, gNB, RAN node, relay node, UE or user device, network node, network entity, DU, CU-CP, CU-CP, . . . or other node) according to an example embodiment.

FIG. 9 is a block diagram of a wireless station 900 or wireless node or network node 900 according to an example embodiment. The wireless node or wireless station or network node 900 may include, e.g., one or more of an AP, BS, gNB, RAN node, relay node, UE or user device, network node, network entity, DU, CU-CP, CU-UP, . . . or other node according to an example embodiment.

The wireless station 900 may include, for example, one or more (e.g., two as shown in FIG. 9) radio frequency (RF) or wireless transceivers 902A, 902B, where each wireless transceiver includes a transmitter to transmit signals and a receiver to receive signals. The wireless station also includes a processor or control unit/entity (controller) 904 to execute instructions or software and control transmission and receptions of signals, and a memory 906 to store data and/or instructions.

Processor 904 may also make decisions or determinations, generate frames, packets or messages for transmission, decode received frames or messages for further processing, and other tasks or functions described herein. Processor 904, which may be a baseband processor, for example, may generate messages, packets, frames or other signals for transmission via wireless transceiver 902 (902A or 902B). Processor 904 may control transmission of signals or messages over a wireless network, and may control the reception of signals or messages, etc., via a wireless network (e.g., after being down-converted by wireless transceiver 902, for example). Processor 904 may be programmable and capable of executing software or other instructions stored in memory or on other computer media to perform the various tasks and functions described above, such as one or more of the tasks or methods described above. Processor 904 may be (or may include), for example, hardware, programmable logic, a programmable processor that executes software or firmware, and/or any combination of these. Using other terminology, processor 904 and transceiver 902 together may be considered as a wireless transmitter/receiver system, for example.

In addition, referring to FIG. 9, a controller (or processor) 908 may execute software and instructions, and may provide overall control for the station 900, and may provide control for other systems not shown in FIG. 9, such as controlling input/output devices (e.g., display, keypad), and/or may execute software for one or more applications that may be provided on wireless station 900, such as, for example, an email program, audio/video applications, a word processor, a Voice over IP application, or other application or software.

In addition, a storage medium may be provided that includes stored instructions, which when executed by a controller or processor may result in the processor 904, or other controller or processor, performing one or more of the functions or tasks described above. According to another example embodiment, RF or wireless transceiver(s) 902A/902B may receive signals or data and/or transmit or send signals or data. Processor 904 (and possibly transceivers 902A/902B) may control the RF or wireless transceiver 902A or 902B to receive, send, broadcast or transmit signals or data.

The example embodiments are not, however, restricted to the system that is given as an example, but a person skilled in the art may apply the solution to other communication systems. Another example of a suitable communications system is the 5G system. It is assumed that network architecture in 5G will be quite similar to that of the LTE-advanced. 5G is likely to use MIMO antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent.

Example embodiments of the various techniques described herein may be implemented in digital electronic circuitry, or in computer hardware, firmware, software, or in combinations of them. Example embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, example embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Example embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising:
at least one processor; and
at least one memory including computer program code;
the at least one memory and the computer program code configured to, with the at least one processor, cause the apparatus at least to:
receive, by a user equipment from a base station, at least one of a channel state information-reference signal resource configuration and a synchronization signal block resource configuration configured based on a wide beam codebook that includes at least one beam that has a pattern with multiple divided beam directions each pointing to different transmit directions;
receive, by the user equipment, at least one of channel state information-reference signal resources and synchronization signal block resources based on at least one of the channel state information-reference signal resources configuration and synchronization signal block resource configuration;
determine, by the user equipment, a type D quasi co-location information based on the channel state information-reference signal resources;
select, by the user equipment, receive beams for the channel state information-reference signal resources based on the type D quasi co-location information or the synchronization signal block resources;
receive, by the user equipment from the base station, a machine learned model trained using the wide beam codebook and a training dataset including wide beam measurements;
predict a beam from a refined beam codebook using the machine learned model with reference signal received power measurements associated with a channel state information report;
determine whether the channel state information-reference signal resources include a repetition indication; and
in response to determining that at least one of the channel state information-reference signal resources and the synchronization signal block resources do not include the repetition indication, select, by the user equipment, a receive beam that can maximize a reference signal received power measurement.

2. The apparatus of claim 1, further comprising computer program code configured to, with the at least one processor, cause the apparatus to:
measure, by the user equipment, reference signal received power for at least one of the channel state information-reference signal resources and the synchronization signal block resources;
generate, by the user equipment, a channel state information report based on the measured reference signal received power; and
communicate, by the user equipment to the base station, the channel state information report.

3. The apparatus of claim 1, wherein the channel state information report includes the predicted beam from the refined beam codebook.

4. An apparatus comprising:
at least one processor; and
at least one memory including computer program code;
the at least one memory and the computer program code configured to, with the at least one processor, cause the apparatus at least to:
transmit, by a base station, at least one of channel state information-reference signal resources and synchronization signal block resources based on a wide beam codebook that includes at least one beam that has a pattern with multiple divided beam directions each pointing to different transmit directions;
receive, by the base station from a user equipment, a channel state information report including a reference signal received power for at least one of the channel state information-reference signal resources and the synchronization signal block resources;
determine a machine learned model that has been trained using the wide beam codebook and a training dataset including wide beam measurements;
predict, by the base station, a beam associated with a refined beam codebook using the machine learned model with wide beam measurements associated with the channel state information report, with the channel state information report used as an input to the machine learned model;
calculate combining coefficients for the two or more narrow beams;
configure at least one of the channel state information-reference signal resources and the synchronization signal block resources based on the wide beam codebook; and
communicate at least one of the configured channel state information-reference signal resources and the synchronization signal block resources to a user equipment
wherein:
the configured channel state information-reference signal resources include a channel state information-reference signal resource with multiple transmission configuration indicator states, and
each configured transmission configuration indicator state includes a type D quasi co-location information.

5. The apparatus of claim 4, further comprising computer program code configured to, with the at least one processor, cause the apparatus to:
combine two or more narrow beams in the wide beam codebook; and
calculate combining coefficients for the two or more narrow beams.

6. A method comprising:
receiving, by a user equipment from a base station, at least one of a channel state information-reference signal resource configuration and a synchronization signal block resource configuration configured based on a wide beam codebook that includes at least one beam that has a pattern with multiple divided beam directions each pointing to different transmit directions;
receiving, by the user equipment, at least one of channel state information-reference signal resources and synchronization signal block resources based on at least one of the channel state information-reference signal resources configuration and synchronization signal block resource configuration;
determining, by the user equipment, a type D quasi co-location information based on the channel state information-reference signal resources;

selecting, by the user equipment, receive beams for the channel state information-reference signal resources based on the type D quasi co-location information or the synchronization signal block resources;

receiving, by the user equipment from the base station, a machine learned model trained using the wide beam codebook and a training dataset including wide beam measurements;

predicting a beam from a refined beam codebook using the machine learned model with reference signal received power measurements associated with a channel state information report;

determining whether the channel state information-reference signal resources include a repetition indication; and in response to determining that at least one of the channel state information-reference signal resources and the synchronization signal block resources do not include the repetition indication, selecting, by the user equipment, a receive beam that can maximize a reference signal received power measurement.

7. The method of claim 6, further comprising:

measuring, by the user equipment, reference signal received power for at least one of the channel state information-reference signal resources and the synchronization signal block resources;

generating, by the user equipment, a channel state information report based on the measured reference signal received power; and communicating, by the user equipment to the base station, the channel state information report.

8. The method of claim 6, wherein the channel state information report includes the predicted beam from the refined beam codebook.

* * * * *